United States Patent
Razavi et al.

(10) Patent No.: US 9,519,843 B2
(45) Date of Patent: Dec. 13, 2016

(54) OBJECT RECOGNITION DEVICE

(75) Inventors: Nima Razavi, Zurich (CH); Juergen Gall, Zurich (CH); Luc Van Gool, Zurich (CH); Ryuji Funayama, Yokohama (JP)

(73) Assignees: TOYOTA JIDOSHA KABUSHIKI KAISHA, Aichi-ken (JP); Eidgenossische Technische Hochschule Zurich, Zurich (CH)

( * ) Notice: Subject to any disclaimer, the term of this patent is extended or adjusted under 35 U.S.C. 154(b) by 0 days.

(21) Appl. No.: 14/126,690

(22) PCT Filed: Jun. 14, 2012

(86) PCT No.: PCT/JP2012/065255
§ 371 (c)(1),
(2), (4) Date: Dec. 16, 2013

(87) PCT Pub. No.: WO2012/173193
PCT Pub. Date: Dec. 20, 2012

(65) Prior Publication Data
US 2014/0133745 A1  May 15, 2014

(30) Foreign Application Priority Data

Jun. 17, 2011 (JP) ................................. 2011-135586

(51) Int. Cl.
*G06K 9/62* (2006.01)
*G06K 9/00* (2006.01)
*G06K 9/46* (2006.01)

(52) U.S. Cl.
CPC ......... *G06K 9/6267* (2013.01); *G06K 9/00791* (2013.01); *G06K 9/00805* (2013.01);
(Continued)

(58) Field of Classification Search
None
See application file for complete search history.

(56) References Cited

U.S. PATENT DOCUMENTS

2007/0041638 A1* 2/2007 Liu ...................... G06K 9/6282
382/170
2008/0263042 A1* 10/2008 Li ....................... G06F 17/3025
(Continued)

OTHER PUBLICATIONS

Leibe, Bastian, Aleš Leonardis, and Bernt Schiele. "Robust object detection with interleaved categorization and segmentation." International journal of computer vision 77.1-3 (2008): 259-289. 31 pages.*

(Continued)

*Primary Examiner* — Sumati Lefkowitz
*Assistant Examiner* — Ryan P Potts
(74) *Attorney, Agent, or Firm* — Sughrue Mion, PLLC (57) ABSTRACT

A learning unit generates a function table indicating the relationship between the class number and position information of an object and the probability of appearance of the object for each small area image pattern of a code book, calculates a sharing matrix indicating the commonality of a feature amount between the classes, makes a tree diagram in which the classes with a similar feature amount are clustered, and calculates the weight of each node in the tree diagram for each small area image pattern. The recognition processing unit compares image data captured by a camera with the code book, selects the closest small area image pattern, extracts the class related to the node with the smallest weight among the nodes with a weight equal to or greater than a threshold value, and votes the position information of the small area image pattern for the class, thereby recognizing the object.

2 Claims, 9 Drawing Sheets

| NUMBER | CLASS |
|---|---|
| 1 | CAR |
| 2 | TRUCK |
| 3 | BUS |
| 4 | BICYCLE |
| 5 | MOTORCYCLE |
| 6 | PEDESTRIAN (ADULT) |
| 7 | PEDESTRIAN (CHILD) |

(52) U.S. Cl.
CPC ......... *G06K 9/4633* (2013.01); *G06K 9/6219* (2013.01); *G06K 9/6282* (2013.01); *G06K 2209/27* (2013.01)

(56) References Cited

U.S. PATENT DOCUMENTS

| | | | | |
|---|---|---|---|---|
| 2010/0232686 A1* | 9/2010 | Dewan | ................ | G06K 9/6209 382/159 |
| 2011/0052063 A1* | 3/2011 | McAuley | ............... | G06K 9/527 382/180 |
| 2012/0039541 A1* | 2/2012 | Fukui | .................. | G06K 9/6282 382/224 |
| 2012/0300980 A1* | 11/2012 | Yokono | .............. | G06K 9/00389 382/103 |

OTHER PUBLICATIONS

Yao, Angela, Juergen Gall, and Luc Van Gool. "A hough transform-based voting framework for action recognition." Computer Vision and Pattern Recognition (CVPR), 2010 IEEE Conference on. IEEE, 2010. 9 pages.*

Juergen Gall, et al., "Class-Specific Hough Forests for Object Detection", Computer Vision and Pattern Recognition, 2009, CVPR 2009 IEEE Conference, Jun. 20, 2009, pp. 1022-1029.

Nima Razavi et al, "Scalable multi-class object detection", Computer Vision and Pattern Recognition(CVPR), Jun. 20, 2011, p. 1505-p. 1512, XP032037943.

Anonymous, "CVPR 2011—papers on the web(http://cvpapers.com/cvpr2011.html)", CV Papers—Computer Vision Resourse, Apr. 29, 2011, XP002735744.

* cited by examiner

| NUMBER | CLASS |
|---|---|
| 1 | CAR |
| 2 | TRUCK |
| 3 | BUS |
| 4 | BICYCLE |
| 5 | MOTORCYCLE |
| 6 | PEDESTRIAN (ADULT) |
| 7 | PEDESTRIAN (CHILD) |

OBJECT RECOGNITION DEVICE

TECHNICAL FIELD

The present invention relates to an object recognition device that recognizes plural kinds of objects on the basis of a captured image.

BACKGROUND ART

A technique for recognizing a traffic environment is absolutely necessary in order to achieve a safety system for a vehicle. Since vehicles, motorcycles, pedestrians, and various other objects appear in the traffic environment, it is necessary to develop an algorithm for recognizing a plurality of objects. In addition, when the problems of the recognition technique are considered, it is necessary to classify the vehicles into a plurality of categories, such as ordinary cars, large-sized vehicles including buses and trucks, and special vehicles. When a change in a viewing direction or the position of the pedestrian is considered, the problems of image recognition need to be considered while the viewing direction and the position of the pedestrian are classified into different categories.

In general, when plural kinds of object recognition (multi-class recognition) are performed, recognition devices for 2-class recognition are combined with each other to achieve object recognition. For example, eight patterns, such as the front surface, right anterior oblique, right lateral, right posterior oblique, rear surface, left posterior oblique, left lateral, and left anterior oblique of the ordinary car, are prepared. In addition, these patterns are prepared for a truck, a bus, a special vehicle, and a motorcycle. For the pedestrian, about eight patterns need to be prepared for, for example, a change in the position of the pedestrian in addition to the direction. Therefore, a large number of recognition devices for 2-class recognition are needed in order to recognize all objects.

However, the time required to recognize the object increases in proportion to at least the number of objects to be recognized. Therefore, this technique is disadvantageous when an immediate response is required, as in a vehicle recognition technique. In addition, since it takes a long processing time and a large number of recognition devices for 2-class recognition need to be prepared, it takes a long development time or the capacity of programs or dictionaries stored in an ECU is likely to increase.

Non-patent Literature 1 discloses a technique which recognizes the class of an object, such as a vehicle or a pedestrian, on the basis of a captured image, without using a recognition device for 2-class recognition.

CITATION LIST

Non Patent Literature

[Non-Patent Literature 1] "Class-Specific Hough Forests for Object Detection", Juergen Gall, Victor Lempitsky, IEEE Conference on Computer Vision and Pattern Recognition (CVPR)

SUMMARY OF INVENTION

Technical Problem

However, in the related art, when the number of image patterns indicating a portion of the object or the number of classes of the object increases, the amount of calculation for recognizing the object increases and the recognition performance deteriorates.

An object of the invention is to provide an object recognition device which can reduce the amount of calculation for recognizing an object and improve the recognition performance.

Solution to Problem

According to an aspect of the invention, there is provided an object recognition device that recognizes an object on the basis of a captured image. The object recognition device includes a function table acquiring unit that acquires a function table indicating a relationship between the class and position information of the object and the probability of appearance of the object for a plurality of image patterns indicating a portion of the object, a pattern appearance frequency calculating unit that calculates the frequency of appearance of each image pattern for the class of the object, using the function table acquired by the function table acquiring unit, a pattern selection unit that compares the captured image with the plurality of image patterns and selects the image pattern corresponding to the captured image, a class extracting unit that extracts the class at which the frequency of appearance of the image pattern selected by the pattern selection unit is equal to or greater than a predetermined value, a voting unit that votes the position information of the image pattern selected by the pattern selection unit for the class extracted by the class extracting unit, and a recognition unit that recognizes the object on the basis of the voting result of the voting unit.

As such, in the object recognition device according to the invention, the function table indicating the relationship between the class and position information of the object and the probability of appearance of the object is acquired for a plurality of image patterns indicating a portion of the object. Then, the frequency of appearance of each image pattern for the class of the object is calculated using the function table. Then, the captured image is compared with the plurality of image patterns to select the image pattern corresponding to the captured image. Then, the class at which the frequency of appearance of the selected image pattern is equal to or greater than a predetermined value is extracted. Then, the position information of the selected image pattern is voted only for the extracted class and the object is recognized on the basis of the voting result. As such, only the class at which the possibility of appearance of the image pattern corresponding to the captured image is high is extracted and the position information of the image pattern is voted. Therefore, it is possible to reduce the amount of calculation for recognizing the object and improve the recognition performance.

The pattern appearance frequency calculating unit may calculate the commonality of a feature amount including the image pattern between the classes on the basis of the function table acquired by the function table acquiring unit and calculate the frequency of appearance of each image pattern for the class on the basis of the commonality of the feature amount. In this case, it is possible to know how much the feature amount including the image pattern is shared between different classes or the same classes, using the commonality of the feature amount. Therefore, the use of the commonality of the feature amount makes it possible to reliably calculate the frequency of appearance of each image pattern for the class of the object.

In this case, the pattern appearance frequency calculating unit may make a tree diagram in which similar classes are clustered on the basis of the commonality of the feature amount and calculate a weight of each node in the tree diagram as the frequency of appearance of the image pattern for the class. In this case, it is possible to simply know a class group in which the image pattern is likely to appear, using the weight of each node in the tree diagram.

Advantageous Effects of Invention

According to the invention, it is possible to reduce the amount of calculation for recognizing an object. In addition, it is possible to improve the object recognition performance.

DESCRIPTION OF EMBODIMENTS

Hereinafter, an object recognition device according to an exemplary embodiment of the invention will be described in detail with reference to the accompanying drawings.

Figure 1:
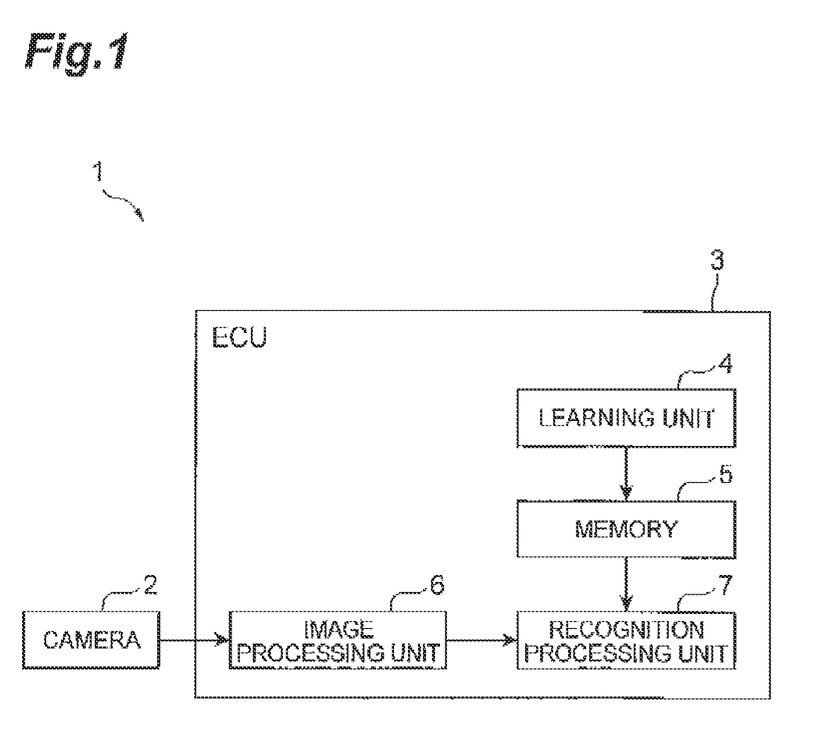
FIG. 1 is a diagram illustrating the schematic structure of an object recognition device according to an embodiment of the invention.

FIG. 1 is a diagram illustrating the schematic structure of the object recognition device according to the embodiment of the invention. In FIG. 1, an object recognition device 1 according to this embodiment is provided in, for example, a vehicle and recognizes objects (for example, other vehicles, bicycles, and pedestrians) around the vehicle.

The object recognition device 1 includes a camera 2 which captures the image of the front side of the vehicle and an ECU (Electronic Control Unit) 3. The ECU 3 includes, for example, a CPU, a memory, such as a ROM or a RAM, and an input/output circuit.

The ECU 3 includes a learning unit 4, a memory 5, an image processing unit 6, and a recognition processing unit 7. The learning unit 4 performs a learning process for recognizing objects using a plurality of learning data items. The memory 5 stores various kinds of data obtained by the learning process of the learning unit 4. The image processing unit 6 performs image processing, such as feature extraction, for the image captured by the camera 2. The recognition processing unit 7 receives image data from the image processing unit 6 and recognizes objects on the image data using various kinds of data stored in the memory 5.

Figure 2:
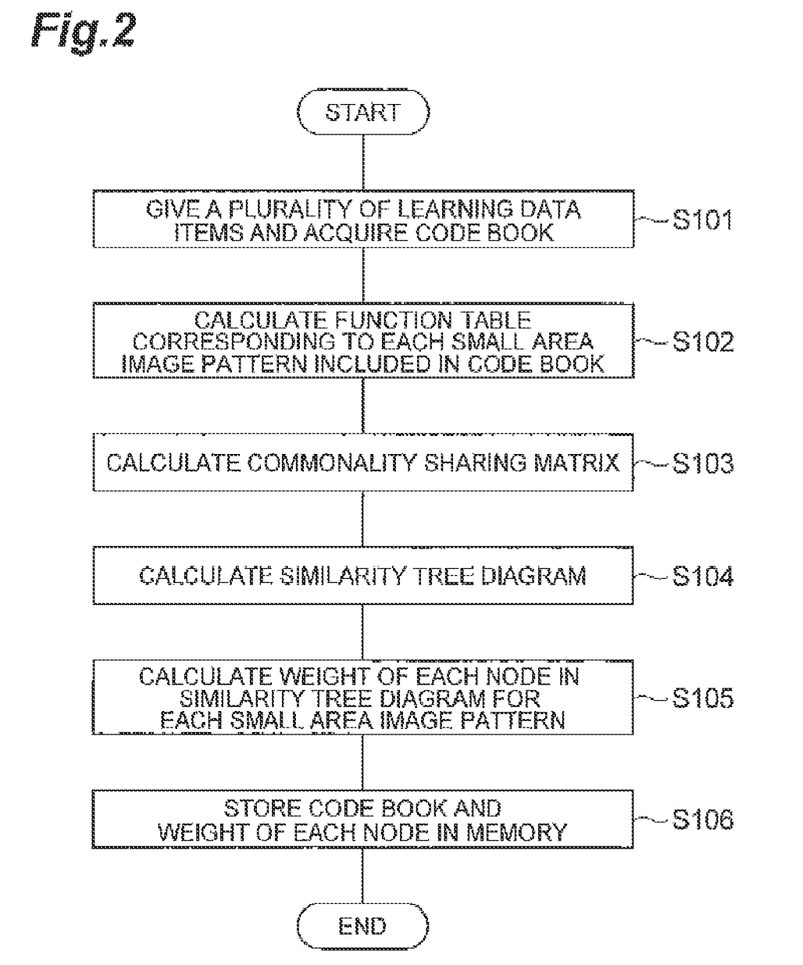
FIG. 2 is a flowchart illustrating the details of a learning process performed by a learning unit shown in FIG. 1.

FIG. 2 is a flowchart illustrating the details of a learning process performed by the learning unit 4. In FIG. 2, first, a plurality of learning data items are given to acquire a code book which is used to recognize objects (Step S101).

Figure 3:
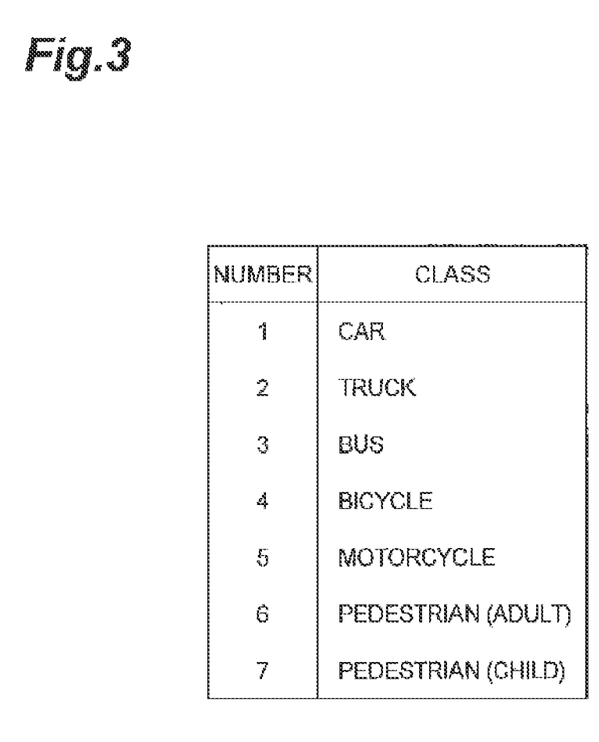
FIG. 3 is a table illustrating an example of the class number of an object.
Figure 4:
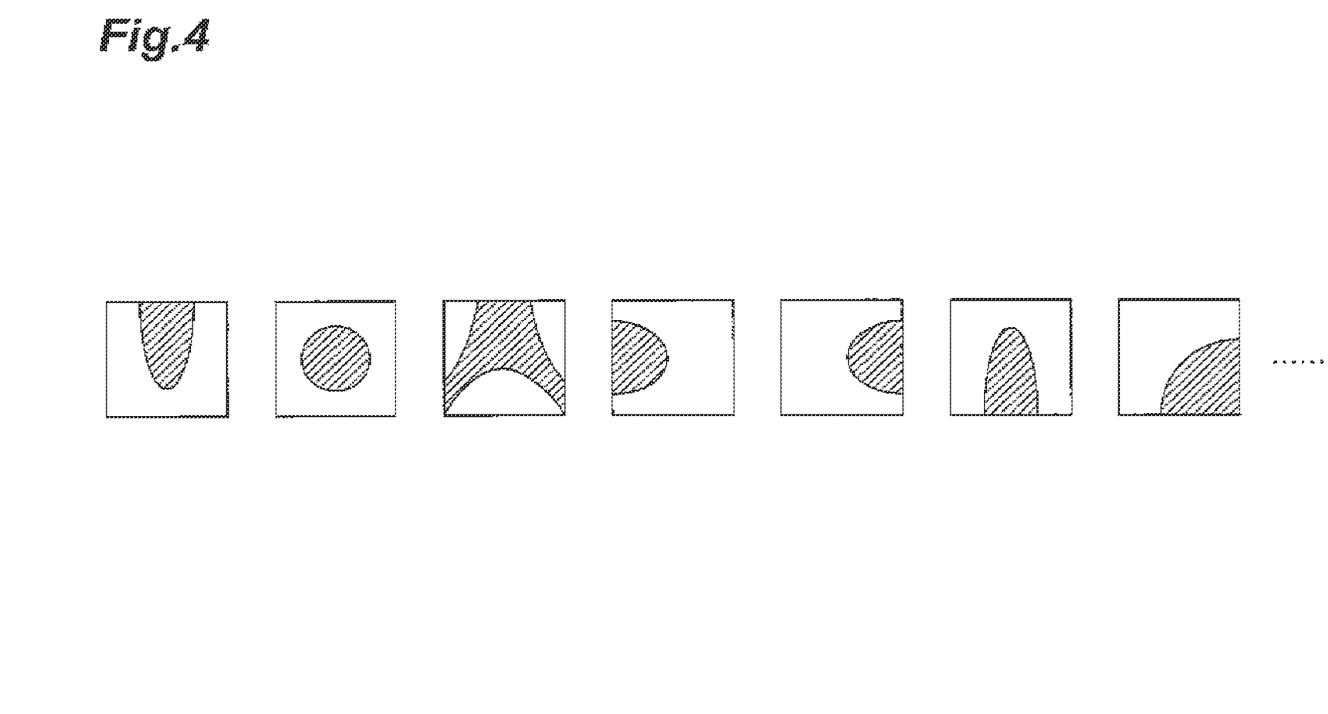
FIG. 4 is a diagram illustrating an example of a code book including a plurality of small area image patterns.

For example, the image of an object, such as a pedestrian or a vehicle, and a class number indicating the kind of object are given as the learning data items. As shown in FIG. 3, class numbers 1 to 7 sequentially indicate, for example, a car, a truck, a bus, a bicycle, a motorcycle, a pedestrian (adult), and a pedestrian (child). As shown in FIG. 4, the code book is a set of a plurality of small area image patterns indicating a portion of the object.

Figure 5:
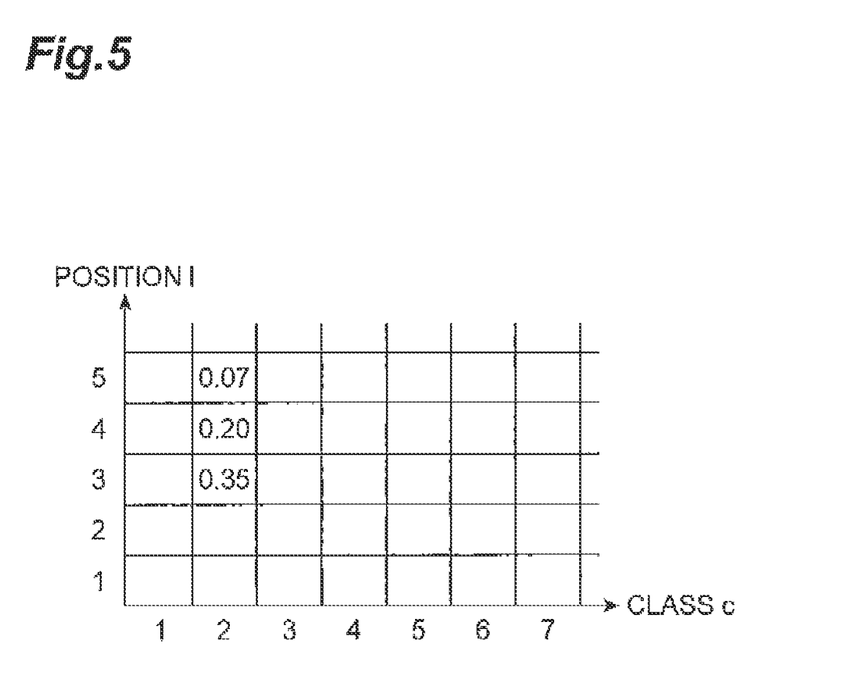
FIG. 5 is a graph illustrating an example of a function table for the small area image pattern.

Then, a function table indicating the relationship between the class number c and position information 1 of an object and the probability of appearance $Z_k(1, c)$ of the object is generated for each small area image pattern included in the code book (Step S102). As shown in FIG. 5, the function table is a two-dimensional table indicating, for example, the relationship between the position and class of an object and the likelihood (probability) of appearance of the object when a small area image pattern k is given. The function table is generated one by one for each small area image pattern of the code book. The position information 1 is arranged at the center of the object and is simply represented one-dimensionally.

In the function table shown in FIG. 5, the probability of appearance $Z_k$ is stored at each grid which is formed by the class number c and the position information 1 of the object. For example, the probability of the small area image pattern k appearing at class 2 and position 3 is 0.35, the probability of the small area image pattern k appearing at class 2 and position 4 is 0.20, and the probability of the small area image pattern k appearing at class 2 and position 5 is 0.07.

Figure 6:
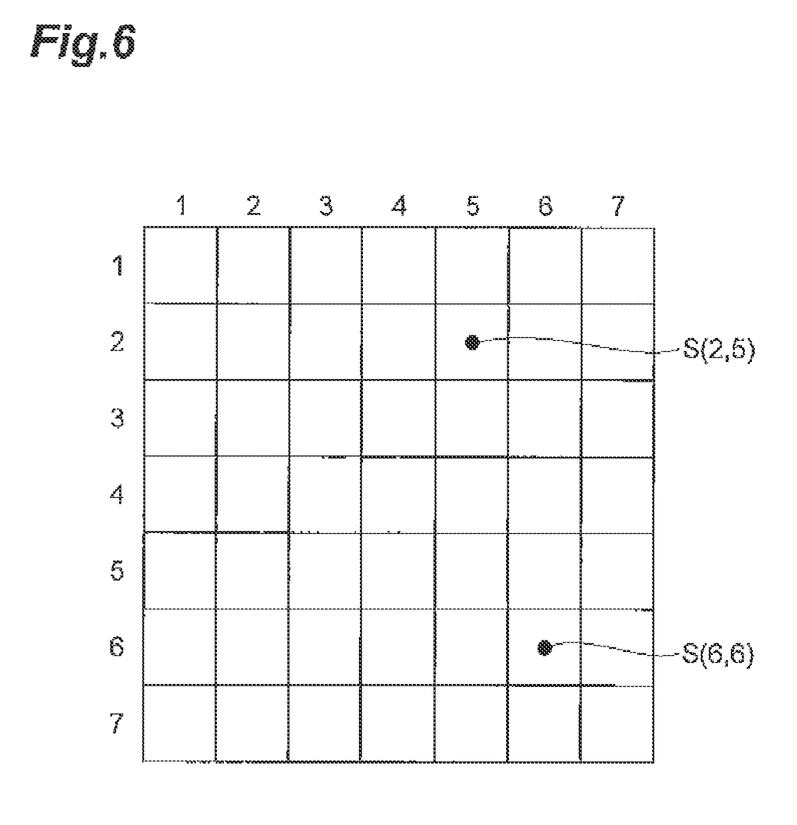
FIG. 6 is a diagram illustrating an example of a commonality sharing matrix.

Then, a commonality sharing matrix is calculated from the function table obtained in Step S102 (Step S103). For example, as shown in FIG. 6, the commonality sharing matrix is a table indicating the commonality of a feature amount (for example, a small area image pattern or position information) between different classes and between the same classes. For example, S(2, 5) indicates the feature amount shared between a truck and a bus and S(6, 6) indicates the feature amount shared between a plurality of pedestrians (adult). In this case, as the shared feature amount increases, a value in the table increases. In addition, one commonality sharing matrix is obtained for the entire code book.

When $Z_k=\{z^k_c, 1\}$ and $K=\{a_k, Z_k\}$ are established and only the commonality of the small area image pattern is considered as the commonality of the feature amount, the commonality sharing matrix is represented by the following expression:

$$S(c_i, c_j) = \frac{1}{\zeta} \sum_{k=1}^{|K|} |z^k_{c_i}| \sum_{h=1}^{|z^k_{c_j}|} z^k_{c_j, l_h},$$ [Expression 1]

$$\zeta = \sum_{t=1}^{|C|} S(c_i, c_t).$$

(where $c_i$ indicates class i and $c_j$ indicates class j).

When the commonalities of the small area image pattern and the position information are considered as the commonality of the feature amount, the commonality sharing matrix is represented by the following expression:

$$S(c_i, c_j) = \frac{1}{\zeta} \sum_{k=1}^{|K|} \sum_{g=1}^{|c_i^k|} \sum_{h=1}^{|c_j^k|} z_{c_j, l_h}^k \theta(I_g, I_h).$$ [Expression 2]

(where $\zeta$ is a normalization factor and $\phi(I_g, I_h)$ is a threshold function).

For example, for the car and the bus, since the probability of the similar small area image pattern appearing at a similar position is high, the commonality of the feature amount between the car and the bus is high. For the car and the pedestrian, since the similar small area image pattern hardly appears, the commonality of the feature amount between the car and the pedestrian is low.

Figure 7:
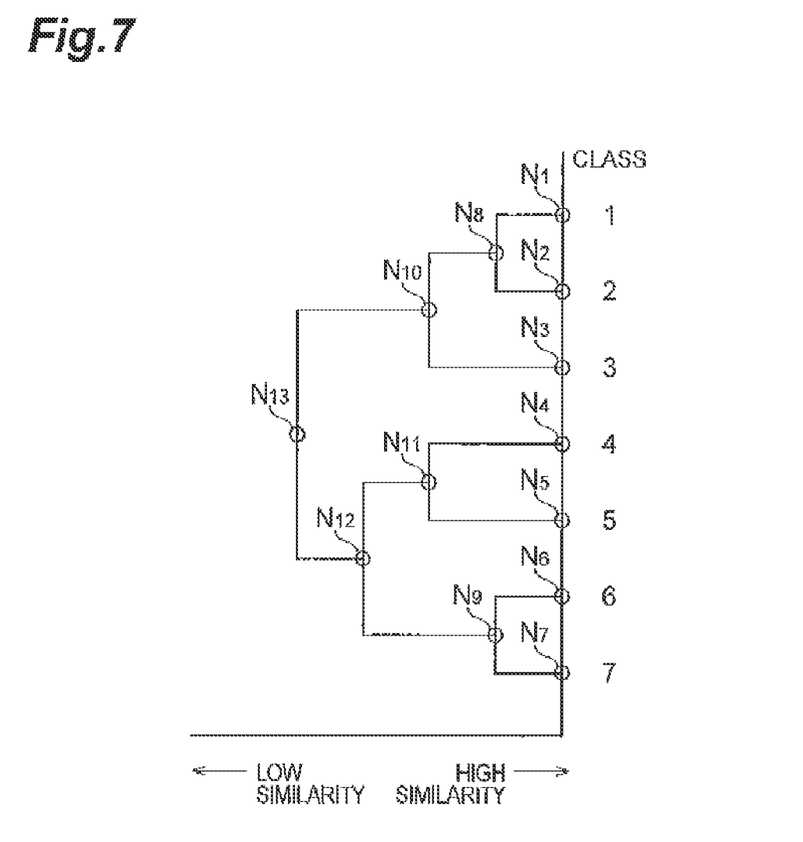
FIG. 7 is a graph illustrating an example of a similarity tree diagram.

Then, a similarity tree diagram is calculated from the commonality sharing matrix obtained in Step S103 (Step S104). For example, as shown in FIG. 7, in the similarity tree diagram, similar classes are grouped (clustered) on the basis of the commonality of the feature amount included in each class. In this case, one similarity tree diagram is obtained for one commonality sharing matrix. That is, one similarity tree diagram is obtained for one code book. In the similarity tree diagram, as a connection position is closer to the end, similarity increases.

For example, an ordinary car (class 1) is similar to a truck (class 2). A group including the ordinary car and the truck is similar to a bus (class 3) to some extent. An adult pedestrian (class 6) is similar to a child pedestrian (class 7). A bicycle (class 4) is similar to a motorcycle (class 5) to some extent. A group including the adult pedestrian and the child pedestrian is slightly similar to a group including the bicycle and the motorcycle.

Then, the weight of each node (a connection point between branches) in the similarity tree diagram obtained in Step S104 is calculated for each small area image pattern of the code book (Step S105). The weight of each node indicates the relationship between the type of small area image pattern and the class at which the small area image pattern appears frequently (the frequency of appearance) in the entire similarity tree diagram. As the probability of appearance of the small area image pattern increases, the weight increases. When the small area image pattern is k and the node is t, a weight $\omega_t^k$ is represented by the following expression:

$$\omega_t^k = \Sigma_{c_j \in C_t} z_{c_j}^k$$ [Expression 3]

In this case, one small area image pattern is normalized such that the sum of the weights of each node is 1. For example, in the similarity tree diagram shown in FIG. 7, when the weights of nodes $N_1$ to $N_{13}$ are $\omega_1^k$ to $\omega_{13}^k$, the sum of $\omega_1^k$ to $\omega_{13}^k$ is 1.

Then, the code book data obtained in Step S101 and the weight data of each node for each small area image pattern obtained in Step S105 are stored in the memory 5 (Step S106).

Figure 8:
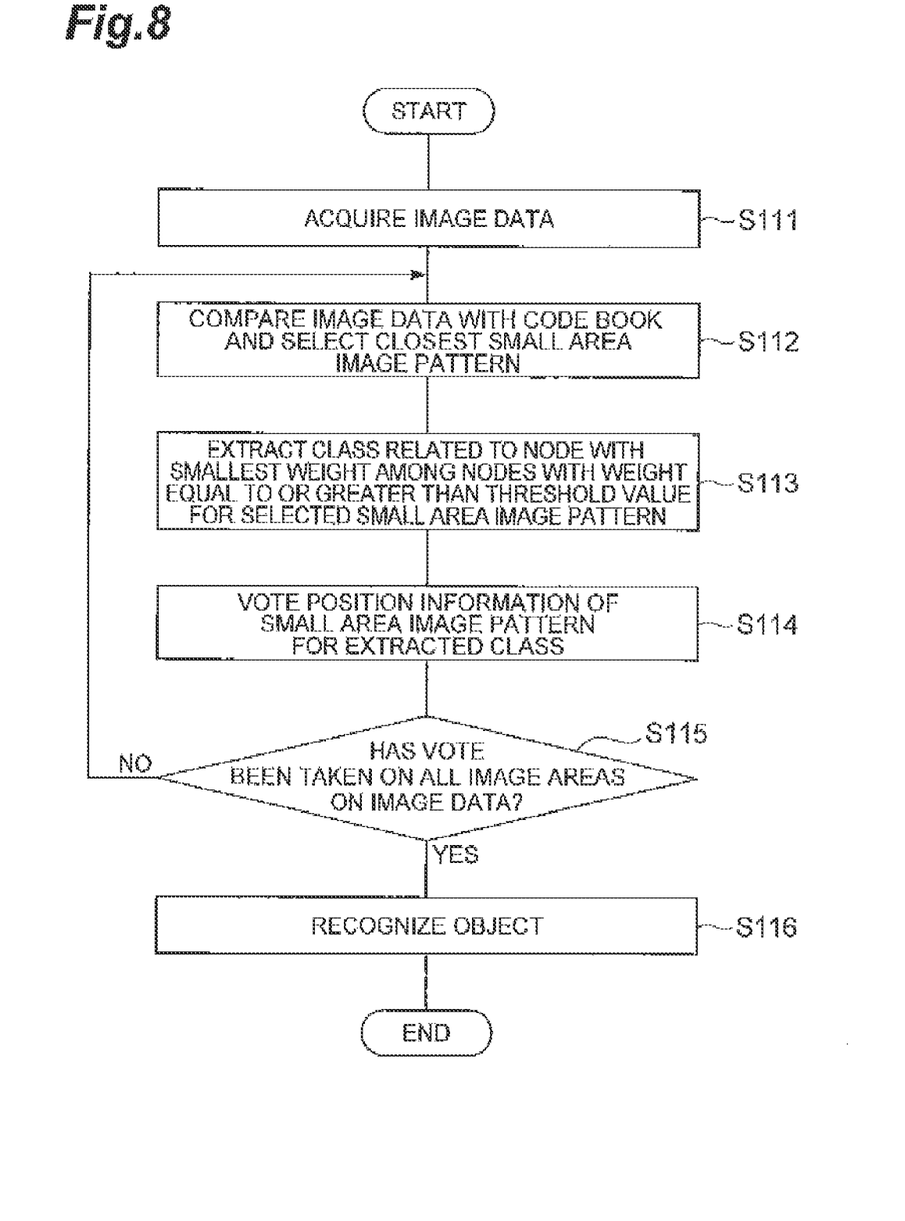
FIG. 8 is a flowchart illustrating the details of a recognition process performed by a recognition processing unit shown in FIG. 1.

FIG. 8 is a flowchart illustrating the details of a recognition process performed by the recognition processing unit 7. In FIG. 8, first, image data for the front side of the vehicle is acquired from the image processing unit 6 (Step S111).

Then, the image data obtained in Step S111 is scanned and is then compared with the code book stored in the memory 5, and the small area image pattern which is closest to the image data is selected from a plurality of small area image patterns included in the code book (Step S112).

Then, the weight of each node in the small area image pattern which is selected in Step S112 is read from the memory 5 and the class related to the node with the smallest weight among the nodes with a weight equal to or greater than a threshold value is extracted (Step S113).

For example, in the similarity tree diagram shown in FIG. 7, when the weights $\omega_1^k$ to $\omega_7^k$ of the nodes $N_1$ to $N_7$ are 0/35, 2/35, 1/35, 4/35, 5/35, 11/35, and 12/35, respectively, the weights $\omega_8^k$ to $\omega_{13}^k$ of the nodes $N_8$ to $N_{13}$ are 2/35, 23/35, 3/35, 9/35, 32/35, and 35/35, respectively. When the threshold value is 22/35, the node with the smallest weight among the nodes with a weight equal to or greater than the threshold value is $N_9$ with a weight of 23/35. The class number related to the node $N_9$ is 6 indicating the pedestrian (adult) and 7 indicating the pedestrian (child).

Figure 9:
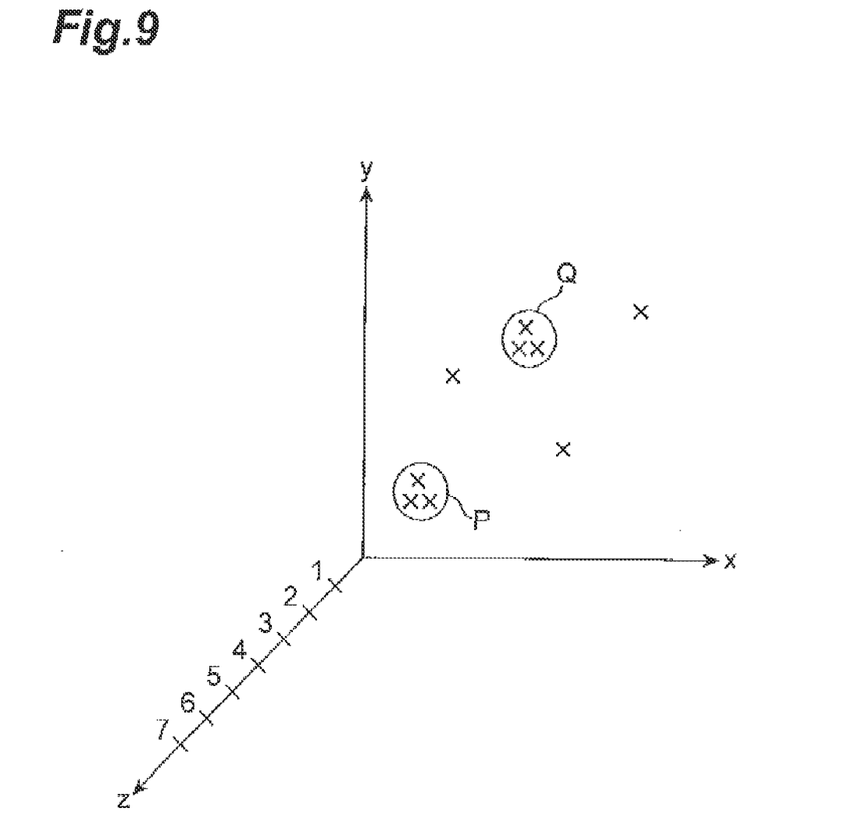
FIG. 9 is a graph illustrating an example of the voting of the position information of the small area image pattern.

Then, the position information of the small area image pattern selected in Step S112 is voted for the class extracted in Step S113 (Step S114). The position information of the small area image pattern is the central position of the object corresponding to the small area image pattern. Specifically, as shown in FIG. 9, the class number and the central position of the object corresponding to the small area image pattern in an xyz three-dimensional coordinate space are voted. In this case, the central position of the object corresponding to the small area image pattern is represented by xy coordinates and the class number is represented by a z coordinate.

Then, it is determined whether a vote has been taken on all image areas on the image data acquired in Step S111 (Step S115). When a vote has not been taken on all image areas on the image data, the process returns to Step S112.

When a vote has been taken on all image areas on the image data, all objects on the image data are recognized from the voting result in Step S114 (Step S116). Specifically, for example, as shown in FIG. 9, when there are aggregates P and Q in which the central positions of the objects corresponding to a plurality of small area image patterns are substantially aligned with each other, the objects are recognized to be included in the classes corresponding to the aggregates P and Q. In this case, the central coordinates (x, y) of each of the aggregates P and Q correspond to the central position on the images of the objects (classes) corresponding to the aggregates P and Q.

In the above description, Steps S101 and S102 performed by the learning unit 4 form a function table acquiring unit which acquires the function table indicating the class and position information of the object and the probability of appearance of the object for a plurality of image patterns indicating a portion of the object. Steps S103 to S105 form a pattern appearance frequency calculating unit which calculates the frequency of appearance of each image pattern for the class of the object using the function table acquired by the function table acquiring unit. Steps S111 and S112 performed by the recognition processing unit 7 form a pattern selection unit which compares the captured image with a plurality of image patterns and selects the image pattern corresponding to the captured image. Step S113 forms a class extracting unit which extracts the class at which the frequency of appearance of the image pattern selected by the pattern selection unit is equal to or greater than a predetermined value. Step S114 forms a voting unit which votes the position information of the image pattern selected by the pattern selection unit for the class extracted by the class extracting unit. Step S116 forms a recognition unit which recognizes an object on the basis of the voting result of the voting unit.

As described above, in this embodiment, the function table indicating the relationship between the class number and position information of the object and the probability of appearance of the object is generated for each small area image pattern included in the code book. Then, the commonality sharing matrix indicating the commonality of the feature amount between the classes is calculated from the function table. Then, the similarity tree diagram in which the classes with a similar feature amount are clustered is made from the commonality sharing matrix and the weight of each node in the similarity tree diagram is calculated for each small area image pattern. Then, the image data captured by the camera 2 is compared with the code book to select the closest small area image pattern from a plurality of small area image patterns included in the code book. Then, for the selected small area image pattern, the class related to the node with the smallest weight among the nodes with a weight equal to or greater than a threshold value is extracted. Then, the position information of the small area image pattern is voted for the class. In this way, the object on the captured image data is recognized.

As such, the position information of the small area image pattern is not voted for all classes, but only the class at which the probability of appearance of the small area image pattern is high is extracted and the position information of the small area image pattern is voted. Therefore, it is possible to reduce the amount of calculation required to recognize the object. In addition, even when there are many kinds of objects to be recognized, it is possible to recognize plural kinds of objects without deteriorating the recognition performance.

The invention is not limited to the above-described embodiment. In the above-described embodiment, for example, the object recognition device 1 is provided in the vehicle. However, the object recognition device 1 may be provided in any apparatus other than the vehicle as long as it can recognize objects using image recognition.

In the above-described embodiment, the learning unit 4 is a portion of the function of the ECU 3. However, the function of the learning unit 4 may be provided outside the ECU 3. For example, a PC may learn the function of the learning unit 4 in advance.

INDUSTRIAL APPLICABILITY

The invention can be used as an object recognition device which recognizes plural kinds of objects on the basis of a captured image.

REFERENCE SIGNS LIST

1: OBJECT RECOGNITION DEVICE
2: CAMERA
3: ECU
4: LEARNING UNIT (FUNCTION TABLE ACQUIRING UNIT AND PATTERN APPEARANCE FREQUENCY CALCULATING UNIT)
5: MEMORY
6: IMAGE PROCESSING UNIT
7: RECOGNITION PROCESSING UNIT (PATTERN SELECTION UNIT, CLASS EXTRACTING UNIT, VOTING UNIT, AND RECOGNITION UNIT)

The invention claimed is:

1. An object recognition device that recognizes an object on the basis of a captured image, comprising:
    a function table acquiring unit configured to acquire a function table indicating a relationship between position information of the object and a probability of appearance of the object for a plurality of classes of the object for a plurality of image patterns indicating a portion of the object;
    a pattern appearance frequency calculating unit configured to calculate the frequency of appearance of each image pattern for the class of the object, using the function table acquired by the function table acquiring unit;
    a pattern selection unit configured to compare the captured image with the plurality of image patterns and to select an image pattern corresponding to the captured image;
    a class extracting unit configured to extract the class at which the frequency of appearance of the image pattern selected by the pattern selection unit is equal to or greater than a predetermined value;
    a voting unit configured to vote the position information of the image pattern selected by the pattern selection unit for the class extracted by the class extracting unit; and
    a recognition unit configured to recognize the object on the basis of a voting result for the class extracted by the extracting unit;
    wherein the class of the object indicates a kind of the object;
    wherein each of the function table acquiring unit, the pattern appearance frequency calculating unit, the pattern selection unit, the class extracting unit, the voting unit and the recognition unit are implemented via a CPU (central processing unit);
    wherein the pattern appearance frequency calculating unit calculates the commonality of a feature amount including the image pattern between the plurality of classes on the basis of the function table acquired by the function table acquiring unit, makes a tree diagram in which similar classes are clustered on the basis of the commonality of the feature amount and calculates a weight of each node in the tree diagram as the frequency of appearance of the image pattern for the class.

2. The object recognition device according to claim 1, wherein each of the plurality of image patterns are individually derived directly from respective single source images.

* * * * *